Dec. 19, 1967   W. B. GITCHEL ET AL   3,359,200
PARTIAL WET AIR OXIDATION OF SEWAGE SLUDGE
Filed Feb. 24, 1966
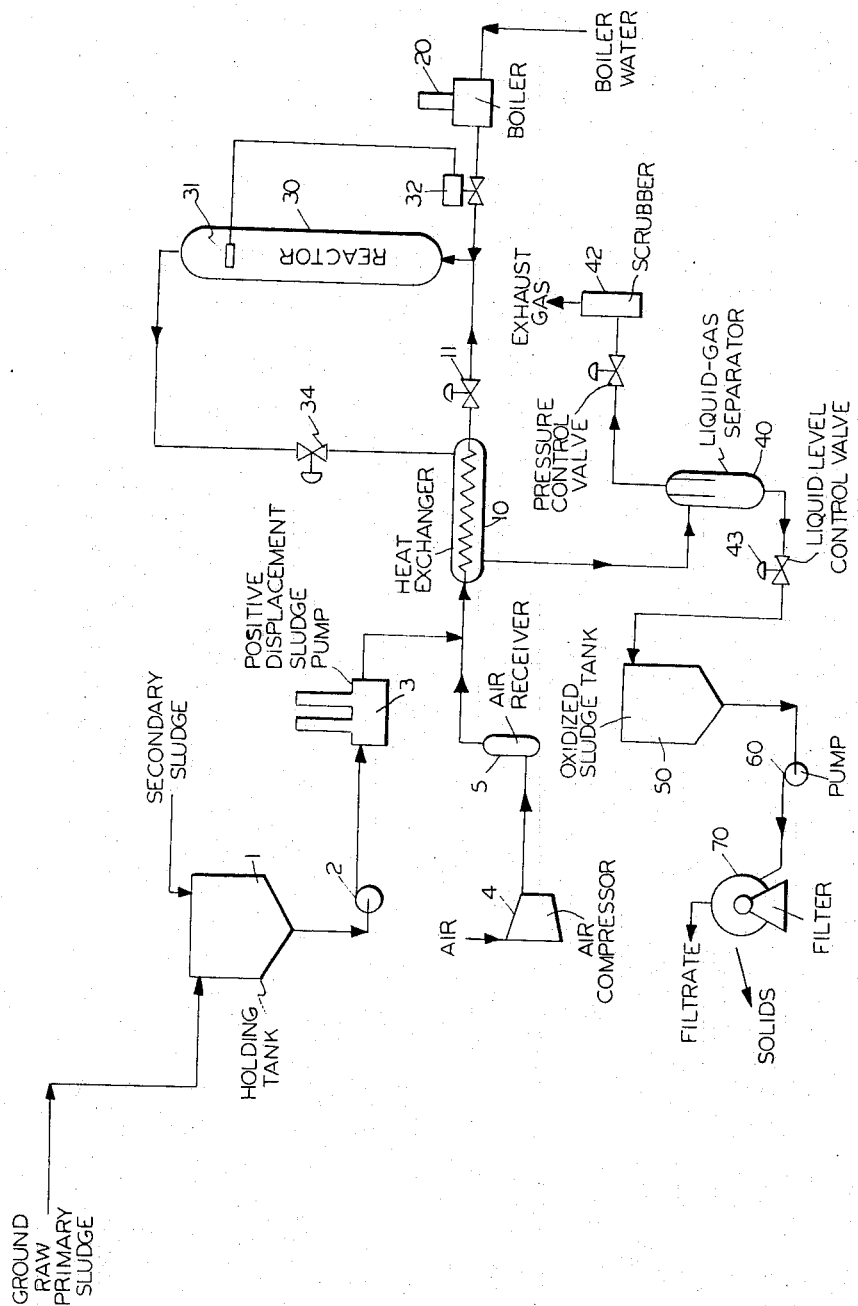
INVENTORS
WAYNE B. GITCHEL
CLARENCE A. HOFFMAN
EUGENE W. SCHOEFFEL
BY
ATTORNEY

United States Patent Office 3,359,200
Patented Dec. 19, 1967

3,359,200
PARTIAL WET AIR OXIDATION OF
SEWAGE SLUDGE
Wayne B. Gitchel and Clarence A. Hoffman, Rothschild, and Eugene W. Schoeffel, Kronenwetter, Wis., assignors to Sterling Drug, Inc., New York, N.Y., a corporation of Delaware
Filed Feb. 24, 1966, Ser. No. 529,874
3 Claims. (Cl. 210—63)

This invention relates to a process for the partial wet air oxidation of sewage sludge, more particularly to a continuous partial wet air oxidation of sewage sludge and other oxidizable aqueous suspensions.

The invention sought to be patented resides in the concept of an improved continuous process for the wet air oxidation of sewage sludge with an excess of a continuous stream of air at a substantially constant temperature above 150°, in which a stream of the sludge is pre-heated by indirect countercurrent heat exchange with a stream of the partially oxidized sludge, which comprises the steps of (a) pre-heating a mixture of the sludge and air by indirect heat exchange to a temperature not exceeding 150° C.; (b) further heating the pre-heated sludge and air mixture to a selected temperature above 150° C., but below that at which autogenetic conditions are reached, by injecting steam directly into the sludge; (c) maintaining the sludge and air mixture at the selected higher temperature for a period of time which reduces its Chemical Oxygen Demand (C.O.D.) from 5 to 45 percent; and (d) maintaining the reaction temperature substantially constant by varying inversely the amount of steam injected into the sludge in response to variations in the reaction temperature from the selected temperature.

The problems associated with dewatering sewage sludges, i.e., primary, aerobic or activated, and digested sludges, is well known in the art. The dewatering capability of these sludges is markedly improved by a technique, now well known in the art, called wet air oxidation. This process, the subject of several patents, including U.S. 2,665,249, involves the oxidation of the organic portion of sludge to produce an essentially inorganic solid residue. In this process, the C.O.D. of the sludge is eliminated. The residue is essentially extremely fine silica and ash.

A significant factor in the operating cost of a plant employing such a wet air oxidation process is the cost of supplying at high pressure the large volumes of compressed air required for the wet air oxidation. Thus, a process which consumes less oxygen per unit weight of sludge can be less expensive to perform. Such a process is that claimed in U.S. Patent 3,060,118. In this modification of the Zimmermann process the same inorganic type residue is produced by reducing by 60–85 percent the C.O.D. of the sludge solids by oxidation and solubilizing the rest, thus reducing proportionately the amount of compressed air required and thus also the cost of the compressed air consumed in the oxidation.

The process of our prior application S.N. 377,694, filed June 24, 1964, now U.S. Patent No. 3,272,740, reduces the C.O.D. of the sludge only 5–45 percent, thus reducing by over half the amount of oxygen consumed in the oxidation. This results in a substantial reduction in power consumption and thus operating costs.

Another factor in operating expense of the wet air oxidation plant as well as its initial cost is the temperature and pressure at which the process is performed. At higher temperatures, high pressure equipment is required. At lower temperatures, less expensive low pressure equipment can be used. The process of S.N. 377,694 can be conducted at lower temperatures and pressures than required for a higher level oxidation process, which provides another source of savings.

Another advantage of the process of S.N. 377,694 is that an innocuous organic cured sewage sludge having optimum processing characteristics is produced if the C.O.D. of the sewage sludge is reduced by only 5–45 percent. The residual insoluble solids are sterile, substantially odorless and useful as a soil conditioner, composting ingredient and fill. An even superior product is obtained if the C.O.D. reduction is from 10 percent to 40 percent, e.g., about 15 to 35 percent. Its specific resistance to filtration and water holding capacity is lower than sewage sludge treated by the Porteous process and its processability in solids separation systems is superior to the ash obtained from sewage sludge oxidized by the process of U.S. 2,665,249 or 3,060,118. The solids obtained by filtration of the cured sludge are useful as a component of soil conditioners and fertilizers because of their fiber and insoluble humic acid content. Because of their low protein content they are innocuous and remain so, in contradistinction to the offensive sludge produced by the Porteous process. It was surprising to discover the portion of the oxidizable material which is oxidized at 5 to 45 percent oxidations is the portion which causes heated sewage sludge to be highly offensive. The solids are high in fiber and organic content, in contradistinction to the inorganic ash obtained by the process of U.S. 2,665,249 or 3,060,118, i.e., highly oxidized material. Their protein content is less than 2.5 percent, and often less than 1.5 percent, and their crude fiber content is at least 25 percent, and often 30 percent or more, dry weight basis. They have a C.O.D. value generally about 0.75 to 1.25 times the weight of the dry solids and sufficient B.t.u. content to be combustible in the dry state. They have other distinguishing properties, as will be apparent from the examples.

The low degrees of oxidation employed in the process of S.N. 377,694 do not destroy the fibrous structure of sewage solids as occurs at higher degrees of oxidation. During vacuum filtration, the fibers form a beneficial mat which retains fines while maintaining a porous filter cake, thereby allowing good air flow through the cake which facilitates maximum drying. The fibers cause the cake to form a continuous sheet not unlike a thick sheet of paper board which, because of its cohesiveness, is easily and cleanly discharged from the filter medium. In addition, since the cake is held together by the fibers it does not readily crack when dried on the filter drum and a uniform pressure drop is maintained through the cake and equal distribution of air through all portions of the cake is maintained. Highly oxidized sludge solids, on the other hand, are without fibers, contain very fine particles, many less than 200 mesh, and form a very compact, sticky cake which as it dries cracks into many small segments thereby permitting air passage through the cracks rather than through the cake itself so that drying is impeded. Also, because of its lack of continuity the cake is more difficult to discharge from the filter drum. It is also easily smeared into the filter media thereby accelerating filter media blinding. The fine particles of the highly oxidized solids also have a tendency to lodge in the filter media openings, thereby eventually clogging the filter media and reducing filtration rates. If filter media blinding is avoided by using a filter cloth with large openings the small particles in highly oxidized solids pass through the filter medium thereby lowering the separation efficiency of the filter and producing a dirty filtrate. A relatively open mesh filter cloth can be used with lowly oxidized solids because the fibers in the solids bridge the filter media openings and form a filter mat which retains the fines.

The following table illustrates the markedly improved filtration characteristics of digested primary sludge when oxidized according to the above-described process so as to achieve 10 percent to 45 percent oxidation, compared with the starting sludge and sludge heated in the absence of air at comparable temperatures.

| Sludge | Specific filtration[1] (Resistance sec.²/g.×10⁷) | Average filtration rate (gal./hr. ft.²) |
|---|---|---|
| Starting primary sewage sludge | 2,000 | <1 |
| Heated in absence of air | 800 | <2 |
| Oxidized 10% | 25 | 7 |
| Oxidized 20% | 4 | 40 |
| Oxidized 45% | 6 | 30 |

At higher oxidation levels, e.g., 60–80 percent, specific resistance is also low, although slightly higher than at 10–45 percent, but because of crude fiber loss above about 45 percent C.O.D. reduction, the cured sludge performs poorer on vacuum filter equipment than sludge whose C.O.D. has been reduced about 5 percent to 45 percent, especially those reduced about 10 percent to 40 percent.

Because a wet air oxidation can readily reduce the C.O.D. of sewage sludge by more than 45 percent under conventional conditions of temperature and pressure in the presence of an excess of oxygen, to achieve a C.O.D. reduction of only about 5 to 45 percent reaction conditions must be such that a higher oxidation level is not possible.

One means of limiting the degree of wet air oxidation is to employ conditions whereby a C.O.D. reduction greater than 45 percent would occur if sufficient oxygen were present but limit the amount of gaseous oxygen supplied so that it is completely consumed before a level of oxidation greater than 45 percent occurs. However, when the amount of oxygen supplied is less than that capable of being consumed under the reaction conditions, the resulting cured sludge has less desirable properties and often is an obnoxious material which tends to foul equipment, similar to that produced by the Porteous process. Therefore, it is necessary to employ oxidation conditions whereby the desired 5–45 percent C.O.D. reduction is achieved without consuming all the gaseous oxygen supplied to the heated sludge.

One means for doing this is by limiting the time during which the sludge and air mixture is maintained at the reaction temperature in the oxidation zone. For example, whereas with unlimited time, about a 65 percent oxidation at about 170° C., about 75 percent at about 180° C., and above about 200° C., virtually complete oxidation can be achieved, lower levels of C.O.D. reduction are also possible if dwell times are limited. In the process of S.N. 377,694 a reaction time is selected which achieves, within the 5–45 percent limits, the desired degree of C.O.D. reduction.

The present invention is directed to a new partial wet air oxidation process for producing the cured sludge having the above-described optimum processing qualities produced by the process of S.N. 377,694 in a practical, trouble-free and economical manner.

The process of S.N. 377,694 does not attempt to maintain a substantially constant reaction temperature. Rather, the reactor temperature is varied as required in order to maintain the gaseous oxygen content of the exiting gases substantially constant. It has now been found that if the partial wet air oxidation is conducted under non-autogenetic conditions, i.e., external heat energy must be supplied to the reaction in order to maintain it at the selected level, the reaction can readily be conducted in a manner which does not consume all the oxygen supplied to it. The present process utilizes non-autogenetic oxidizing conditions and because it does, it is not necessary to alter the reaction temperature continually or at intervals in order to maintain oxygen in the exiting gases.

An important factor in the cost of conducting the wet air oxidation process is the manpower required to perform it. High temperature, high pressure autogenetic oxidations require closer supervision than non-autogenetic oxidations performed at lower temperatures and pressures. Because the present process is non-autogenetic, it is readily adaptable to economical automated performance and to single shift operation.

Several problems arise in attempting to perform a continuous partial non-autogenetic wet air oxidation process in an economical, trouble-free manner. One is controlling the process so that uniform conditions are maintained. Another is maintaining down-time for cleaning equipment at a minimum. Another is trouble-free operation with minimum supervision and with low cost equipment. These and other problems prevent merely modifying one of the conditions of the Zimmermann process, e.g., reaction time, temperature, pressure, air flow, so that a lower level of oxidation is, theoretically at least, capable of being achieved.

Because the partial wet air oxidation process of this invention is not autogenetic, i.e., not self-sustaining, external heat energy must be supplied to the sludge so as to achieve and maintain the desired reaction temperature. Moreover, to maintain a substantially constant reaction temperature in a continuous oxidation the amount of heat energy supplied must be varied from time to time in response to a rise or drop in reaction temperature.

One technique for maintaining reaction temperature substantially constant is to vary the C.O.D. of the incoming sludge, e.g., by dilution. However, the response is sluggish and there is the danger of terminating the reaction by excessive dilution or exhausting the oxygen if the sludge becomes too concentrated.

Another technique is to vary the flow rate of the incoming sludge. However, this is possible only within narrow limits. Moreover, there is an undesirable time lag in the system in response to such variation in sludge flow. Further, to do so requires a variable flow-pump or complicated by-pass system, which increases the initial expense of the system and decreases its efficiency and dependability.

Adjusting pressure is another method of maintaining a constant reaction temperature in a continuous operation, e.g., by venting. However, such a technique is relatively wasteful of heat energy. Moreover, a relative minor change in pressure can have an undesirably large effect upon temperature. Also, it is not possible by this procedure to raise a reaction temperature which has drifted downward back to the desired temperature.

Another method of maintaining the temperature of the oxidation constant is to adjust the amount of external heat energy supplied to the reaction. This method has proved to be the most acceptable method of regulating reaction temperature and the process of this invention therefore employs this technique.

Because the sludge conventionally is pre-heated by countercurrent heat exchange with the oxidized mixture, a constant reaction temperature can be achieved by the amount of heat transferred, e.g., by by-passing a portion of oxidized mixture or one or more units of a multiple unit heat exchanger so that less heat is transferred to the incoming sludge. However, such a procedure requires expensive regulating mechanism.

A problem associated with pre-heating the incoming sludge in heat exchangers is the hot sludge rapidly coats and ultimately fouls the tubes of the heat exchangers. This increases operating costs, shut-down cleaning time, the amount of heat energy which must be supplied to the sludge in addition to that transferred from the oxidized sludge and in other ways complicates the operation of the equipment.

It is an object of this invention to provide a continuous process for the partial wet air oxidation of sewage sludge to produce an oxidized organic sludge having optimum processing characteristics in a simple, easily regulated manner. It is a further object to provide a process whereby one or more of the above objectives are achieved by a process having lower initial and operating costs and more trouble-free in operation. Other objects will be apparent to those skilled in the art to which this invention pertains.

The following is a description of the invention and the best mode contemplated for carrying it out.

In the process of this invention, a continuous stream of sewage sludge is oxidized by a non-autogenetic partial wet air oxidation with a continuous stream of an oxygen-containing gas. The stream of sludge is preheated to a temperature not exceeding about 150° C., which is below the desired reaction temperature, by indirect heat exchange. The pre-heated sludge is then heated to the desired reaction temperature by directly injecting steam into the heated sludge in an amount sufficient to raise the pre-heated sludge to the temperature at which the oxidation is to be conducted. The reaction temperature is maintained substantially constant by varying the heat energy supplied to the pre-heated sludge by the steam in response to variations in reaction temperature.

This process reduces and virtually eliminates fouling and scaling of heat exchange surfaces; provides a precise yet simple, inexpensive and reliable means for regulating reaction temperature; simplifies start-up procedure and thus lends itself to short, e.g., one shift, runs; and permits use of low C.O.D. sludges because reaction temperature can readily be reached.

With reference to the drawing, ground sewage sludge is pumped from holding tank 1 by low pressure pump 2. The pressure is raised to operating pressure by positive displacement sludge pump 3. Air, supplied by compressor 4 to receiver 5, is mixed with the sludge. The air-sludge mixture is passed through the tube side of heat exchanger 10 and valve 11 and then mixed with steam provided by boiler 20. The sludge-air mixture is then passed through the reactor 30. The exiting mixture of oxidized sludge and gases passes through valve 34 and then the shell side of heat exchanger 10. The cooled sludge passes through liquid-gas separator 40 where the gaseous phase is separated and discharged through pressure control valve 41 to a scrubber 42 and then to the atmosphere. The separated liquid phase is discharged through liquid control valve 43 to a surge tank 50 and then, by pump 60 to a filtration system 70 or a sand bed (not shown) which removes the insoluble solids from the liquid phase.

In start-up operation, sludge from a settling system of the sewage plant, blended if necessary with sludge from other sources, e.g., secondary sludge, to obtain a mixture having a C.O.D. within an acceptable range, is pumped by pumps 2 and 3 to the empty reactor 30 until it is about two-thirds full. The reactor is isolated by closing valves 11 and 34. Steam is pumped into the reactor until the temperature of the contents rises to the desired operating temperature, usually about 160–185° C. The rest of the system is pressurized with air provided by compressor 4, the selected pressure being achieved by regulating pressure control valve 41. Valves 11 and 34 are opened and pumps 2 and 3 activated.

In operation, the reactor becomes full and the oxidized sludge and gas mixture exiting from reactor 30 to the shell side of heat exchanger 10 is used to pre-heat the incoming sludge to a temperature not exceeding 150° C., usually about 125–150° C. The oxidized sludge mixture is cooled to about 50–65° C. by the heat exchange.

The pre-heated sludge is then brought to the selected operating temperature with steam from boiler 20, e.g., 155–200° C., usually 160–185° C., as it is difficult to achieve a non-autogenetic oxidation at temperatures above 185° C. The selected temperature is maintained by thermocouple 31 which, in response to a rise in temperature above the selected reactor temperature activates cut-off valve 32, which temporarily shuts off the supply of steam. The valve re-opens when reactor temperature drops below the selected operating temperature. By adjusting the sensitivity of thermocouple 31, reactor temperature is maintained as close as desired to the selected operating temperature. After removal of the gaseous phase in a conventional manner in separator 40, the oxidized sludge is then pumped to surge tank 50. The now-readily separable insoluble solids are removed from the sludge on sand beds or with filtration equipment 70 and the filtrate returned to the system, e.g., to primary settling tanks.

In shut-down operation, water is substituted for incoming sludge until the tubes of the heat exchanger 10 are cleared of sludge. Valves 33, 11 and 34 are closed to isolate the reactor and air compressor 4 and boiler 20 shut down.

By pre-heating the incoming sludge to a temperature not exceeding 150° C., excessive scaling of heat exchanger surfaces is eliminated. Shut-down time for cleaning is reduced significantly. Start-up procedure is simple and readily understood by plant personnel. Uniform, non-fluctuating reaction conditions are readily and safely achieved with automatic equipment. Sludge of too low C.O.D. concentration to maintain selected oxidation temperature can be used because of the supplemental steam injection. Start-up and shut-down operation is simple and lends itself to short, e.g., eight hour, runs. Initial equipment and operating costs are low. Thus, the system is particularly useful in small plants which heretofore could not use anything except conventional primary and digester systems to treat sewage.

In one run using the equipment shown in FIGURE 1, a finely ground uniform primary sewage sludge in tank 1 containing about 80 g./l. C.O.D., preheated in heat exchanger 10 to 145° C., was pumped through the reactor at a velocity of about 5 feet per second (about 100 gallons per minute). Air sufficient to reduce the C.O.D. of the sludge between 25 and 30 percent was provided by compressor 4. Steam from boiler 20 was injected into the reactor, maintained at about 600 p.s.i., in amounts which maintained the reactor temperature at 185° C. The reaction temperature was measured and fluctuations from the selected temperature were automatically compensated for by valve 32 opening and shutting, thus varying the amount of steam supplied to the reactor. The oxidation was continued for eight hours. The exiting oxidized sludge was continuously filtered on a rotary drum vacuum filter. A high cake discharge rate was achieved and the drum cloth rarely required clearing. The cake was dried in a hot air oven and ground to granular powder using conventional equipment. The dry solids were a substantially odorless, highly fibrous organic material much like humus with a protein content below 2.5 percent and a crude fiber content above 25 percent. It improved considerably the agricultural qualities of very sandy and clay soils.

Non-autogenetic conditions can be achieved in several ways. As stated above, maintaining the reaction temperature below 200° C. and more desirably not over 185° C. is the most convenient means of doing so. The exact temperature at which the oxidation becomes autogenetic is dependent upon several factors. One is the fuel content of the sludge to be oxidized. If the sludge is dilute, the heat energy generated by the oxidation is less and has less effect upon the temperature of the sludge. Therefore, sludges with low C.O.D. can be non-autogenetically oxidized at a higher temperature than sludges with higher C.O.D.'s. Thus, the sludge can be diluted until the reaction becomes non-autogenetic, e.g., by recirculating a portion of the effluent.

Also, at the relatively low temperatures employed to achieve low (5–45 percent) partial oxidations, the reaction is not instantaneous. Therefore, less oxidation will take place during the available reaction time when a short, e.g., 2–15 minutes, dwell time than if a longer, e.g., 15–30 minutes, dwell time is employed. Thus, if at the selected reaction temperature the reaction tends to become autogenetic with the sludge being oxidized, the sludge flow rate can be increased until the reaction becomes non-autogenetic. However, equipment considerations limit to some extent this means of achieving a non-autogenetic oxidation. Preferably, the reaction temperature is regulated until non-autogenetic oxidation conditions are achieved.

It will be apparent the process of this invention can use other oxidizable aqueous organic wastes, e.g., those from the paper or textile industries, which have comparable C.O.D. values. Other variations will be apparent to those skilled in the art to which this invention pertains.

What is claimed is:

1. In a continuous process for the wet air partial oxidation of sewage sludge at a substantially constant temperature in which a continuous stream of said sludge of substantially constant volume is pre-heated by indirect countercurrent heat exchange with a continuous stream of the oxidized sludge and then partially oxidized at a temperature above 150° C. with a substantially constant volume of air in an amount sufficient to maintain gaseous oxygen in the oxidized mixture, the improvement which comprises
    (a) pre-heating a mixture of the sludge and air by the indirect heat exchange to a temperature not exceeding 150° C.;
    (b) heating the pre-heated sludge and air mixture to a temperature above 150° C. by injecting steam directly into the mixture;
    (c) maintaining the sludge at the selected temperature for a period of time which reduces from 5 to 45 percent the Chemical Oxygen Demand of the sludge by non-autogenetic wet air oxidation; and
    (d) maintaining the reaction temperature substantially constant by varying the amount of steam injected into the sludge in response to variations in the reaction temperature.

2. A process according to claim 1 wherein the sludge and air mixture is heated with steam to a temperature from 160 to 185° C.

3. A process according to claim 2 wherein the mixture of sludge and air is maintained at 160 to 185° C. for a period of time which reduces from 10 to 40 percent the Chemical Oxygen Demand of the sludge.

References Cited

UNITED STATES PATENTS 3,060,118  10/1962  Schoeffel _____ 210—3
3,272,739  9/1966   Earle et al. _____ 210—63

OTHER REFERENCES

Abel et al.: Oxidation and Stabilization of Sewage Sludges With Oxygen at Elevated Temperatures and Pressures, Sewage and Ind. Wastes, vol. 26, December 1954, pp. 1450–1452 (P.O.S.L.).

MICHAEL E. ROGERS, *Primary Examiner.*

M. E. ROGERS, *Assistant Examiner.*